United States Patent
Yang et al.

(10) Patent No.: US 7,801,578 B2
(45) Date of Patent: Sep. 21, 2010

(54) ELECTRONIC DEVICE AND ROTATING MECHANISM

(75) Inventors: Jian-Dong Yang, Jiangsu Province (CN); Hui Zhang, Jiangsu Province (CN)

(73) Assignee: Qisda Corporation, Taoyuan County (TW)

(*) Notice: Subject to any disclaimer, the term of this patent is extended or adjusted under 35 U.S.C. 154(b) by 540 days.

(21) Appl. No.: 11/934,866

(22) Filed: Nov. 5, 2007

(65) Prior Publication Data

US 2008/0108398 A1 May 8, 2008

(30) Foreign Application Priority Data

Nov. 8, 2006 (TW) .............................. 95141414 A

(51) Int. Cl.
*H04M 1/00* (2006.01)
(52) U.S. Cl. ............... 455/575.3; 455/575.1; 455/550.1
(58) Field of Classification Search ............. 455/575.3, 455/575.1, 550.1, 575.4, 575.8, 90.3
See application file for complete search history.

(56) References Cited

U.S. PATENT DOCUMENTS

| | | | | |
|---|---|---|---|---|
| 7,522,946 | B2* | 4/2009 | Im | 455/575.3 |
| 2004/0218092 | A1* | 11/2004 | Kim | 348/375 |
| 2005/0282596 | A1* | 12/2005 | Park et al. | 455/575.3 |
| 2008/0026802 | A1* | 1/2008 | Carlson | 455/575.1 |

* cited by examiner

*Primary Examiner*—Sonny Trinh

(57) ABSTRACT

An electronic device and a rotating mechanism thereof are provided. The electronic device includes a first casing, a second casing, and a rotating mechanism. The first casing has a first receiving space and a first hole disposed a first side thereof, wherein the first receiving space is intercommunicated with the first hole. The second casing has a second receiving space and a second hole disposed a second side thereof, wherein the second receiving space is intercommunicated with the second hole. The rotating mechanism includes a shaft, a first fixing element and a second fixing element. The shaft has a center axis, wherein part of the shaft is received in the first receiving space and part of the shaft is received in the second receiving space, such that the first casing can be rotated around the center axis with respect to the second casing.

14 Claims, 10 Drawing Sheets

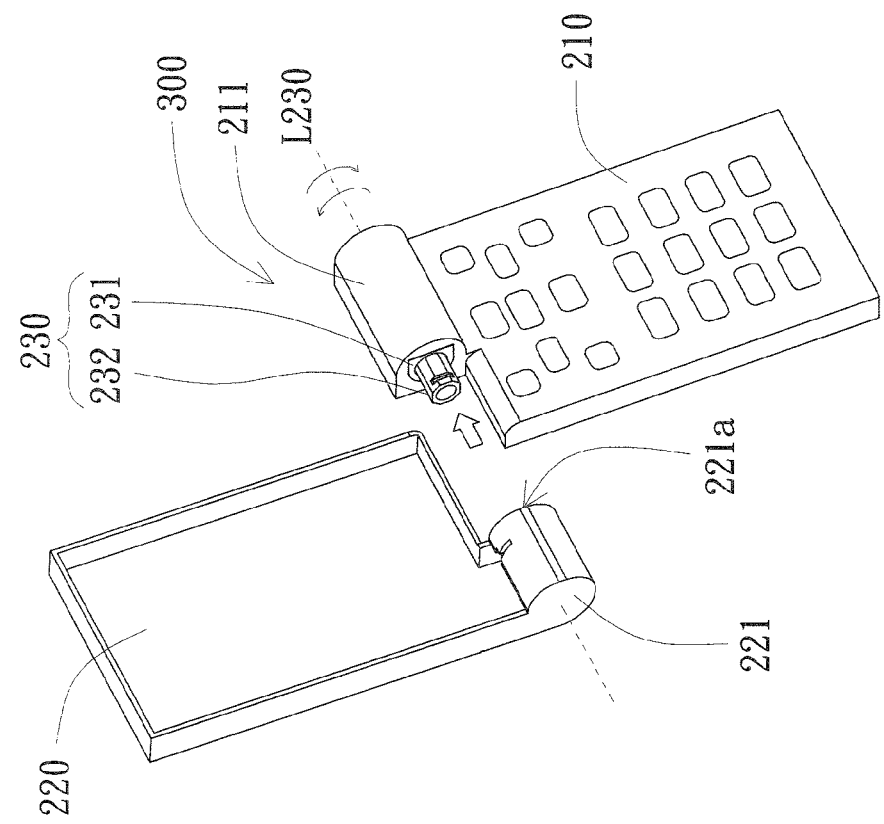
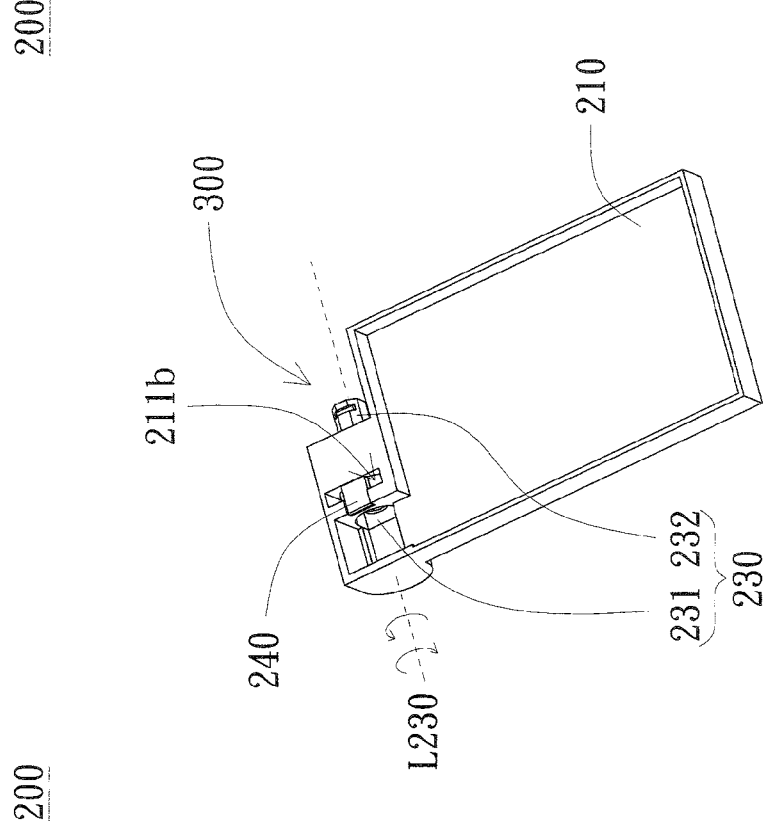

ELECTRONIC DEVICE AND ROTATING MECHANISM

This application claims the benefit of Taiwan application Serial No. 95141414, filed on Nov. 8, 2006, the subject matter of which is incorporated herein by reference.

BACKGROUND OF THE INVENTION

1. Field of the Invention

The invention relates in general to an electronic device and a rotating mechanism thereof, and more particularly to a foldable electronic device and a rotating mechanism thereof.

2. Description of the Related Art

Mobile phone being portable and not subjected to the venue of use has gained great popularity and been widely used. The flip-top mobile phone, which folds the screen to the body of the electronic device, not only reduces the length of the mobile phone but also protects the screen. The flip-top mobile phone is a very popular mobile phone model beloved by many users. The structure of a conventional flip-top mobile phone is elaborated below with accompanied drawings.

Referring to FIG. 1A, an exploded diagram of a conventional mobile phone 100 is shown. The conventional mobile phone 100 using a dual-pivotal structure as a rotating mechanism includes a display casing 110, a host casing 120 and a shaft 130. The display casing 110 is for receiving a display screen. The host casing 120 is for receiving a keypad, a main circuit board and a power. The display casing 110 includes a first protrusion 111 having a first receiving space 111a. The host casing 120 has a second protrusion 122 and a third protrusion 123. The second protrusion 122 has a second receiving space 122a. The third protrusion 123 has a third receiving space 123a.

The first receiving space 111a is for receiving and enabling the shaft 130 to rotate within. The second receiving space 122a is for receiving one end of the shaft 130 and enabling one end of the shaft 130 to be coupled with the second protrusion 122. The third receiving space 123a is for receiving the other end of the shaft 130 and enabling the other end of the shaft 130 to be coupled with the third protrusion 123.

Referring to FIG. 1B, an assembly diagram of the mobile phone 100 of FIG. 1A is shown. When the shaft 130 placed in the first receiving space 111a is coupled with the second protrusion 122 and the third protrusion 123, the shaft 130 and the second protrusion 122 together form a pivot, and the shaft 130 and the third protrusion 123 form another pivot. The mobile phone 100 uses dual-pivotal structure to clamp the shaft 130 for rotating the display casing 110 and the shaft 130, such that the display casing 110 can be rotated with respect to the host casing 120.

However, the display screen inside the display casing 110 needs to be electrically connected to the main circuit board and the power inside the host casing 120. The display screen is electrically connected to the main circuit board and the power via a flexible circuit board or a flexible wire. The conventional mobile phone 100 is subjected to the shaft 130, the second protrusion 122 and the third protrusion 123, hence making the disposition of the flexible circuit board or the flexible wire relatively difficult.

Moreover, the rotating mechanism of the conventional mobile phone 100 is complicated, and costive moulds are required for forming the first protrusion 111, the second protrusion 122 and the third protrusion 123. Furthermore, the two ends of the shaft 130 must be squeezed in order to be coupled with the second protrusion 122 and the third protrusion 123, making the assembly much more difficult, not only increasing labor hour but also increasing defects. Therefore, how to resolve the above problems has become a focus in the research and development of the semiconductor and related industries.

SUMMARY OF THE INVENTION

The invention discloses an electronic device and a rotating mechanism thereof. The assembly of the electronic device is simplified with the structure of combining a shaft with a first fixing element and a second fixing element. Firstly, the shaft is mounted on the first casing. Next, the second casing is mounted on the shaft. Then, a first fixing element is inserted into the first hole and is coupled with the shaft, and a second fixing element is inserted into the second hole and is coupled with the shaft. The assembly process is simplified, not only decreasing the required labor hour but also reducing the defects. Moreover, the shaft has a wiring channel, such that the flexible wire can easily pass through the wiring channel, further resolving the difficulty encountered during the wiring process.

According to a first aspect of the present invention, an electronic device including a first casing, a second casing and a rotating mechanism is provided. The first casing has a first receiving space and a first hole disposed a first side thereof, wherein the first receiving space is intercommunicated with the first hole. The second casing has a second receiving space and a second hole disposed a second side thereof, wherein the second receiving space is intercommunicated with the second hole. The rotating mechanism includes a shaft, a first fixing element and a second fixing element. The shaft has a center axis, wherein part of the shaft is received in the first receiving space and part of the shaft is received in the second receiving space, such that the first casing can be rotated around the center axis with respect to the second casing. The first fixing element is inserted into the first hole and is coupled with the shaft, such that the shaft will not be moved with respect to the first casing along the direction of the center axis. The second fixing element is inserted into the second hole and is coupled with the shaft, such that the shaft will not be move with respect to the second casing along the direction of the center axis.

According to a second aspect of the present invention, a rotating mechanism disposed in an electronic device is provided. The electronic device includes a first casing and a second casing. The first casing has a first receiving space and a first hole disposed a first side thereof, wherein the first receiving space is intercommunicated with the first hole. The second casing has a second receiving space and a second hole disposed a second side thereof, wherein the second receiving space is intercommunicated with the second hole. The rotating mechanism includes a shaft, a first fixing element and a second fixing element. The shaft has a center axis, wherein part of the shaft is received in the first receiving space and part of the shaft is received in the second receiving space, such that the first casing can be rotated around the center axis with respect to the second casing. The first fixing element is inserted into the first hole and is coupled with the first recess, such that the shaft will not be moved with respect to the first casing along the direction of the center axis. The second fixing element is inserted into the second hole and is coupled with the second recess, such that the shaft will not be move with respect to the second casing along the direction of the center axis.

The invention will become apparent from the following detailed description of the preferred but non-limiting embodiments. The following description is made with reference to the accompanying drawings.

BRIEF DESCRIPTION OF THE DRAWINGS

FIG. 6 is a perspective of the shaft and the first casing of FIG. 5 with the first fixing element having been inserted into the first hole;

FIG. 7 is a perspective of the first casing, the shaft and the second casing of FIG. 6;

DETAILED DESCRIPTION OF THE INVENTION

Figure 1A:
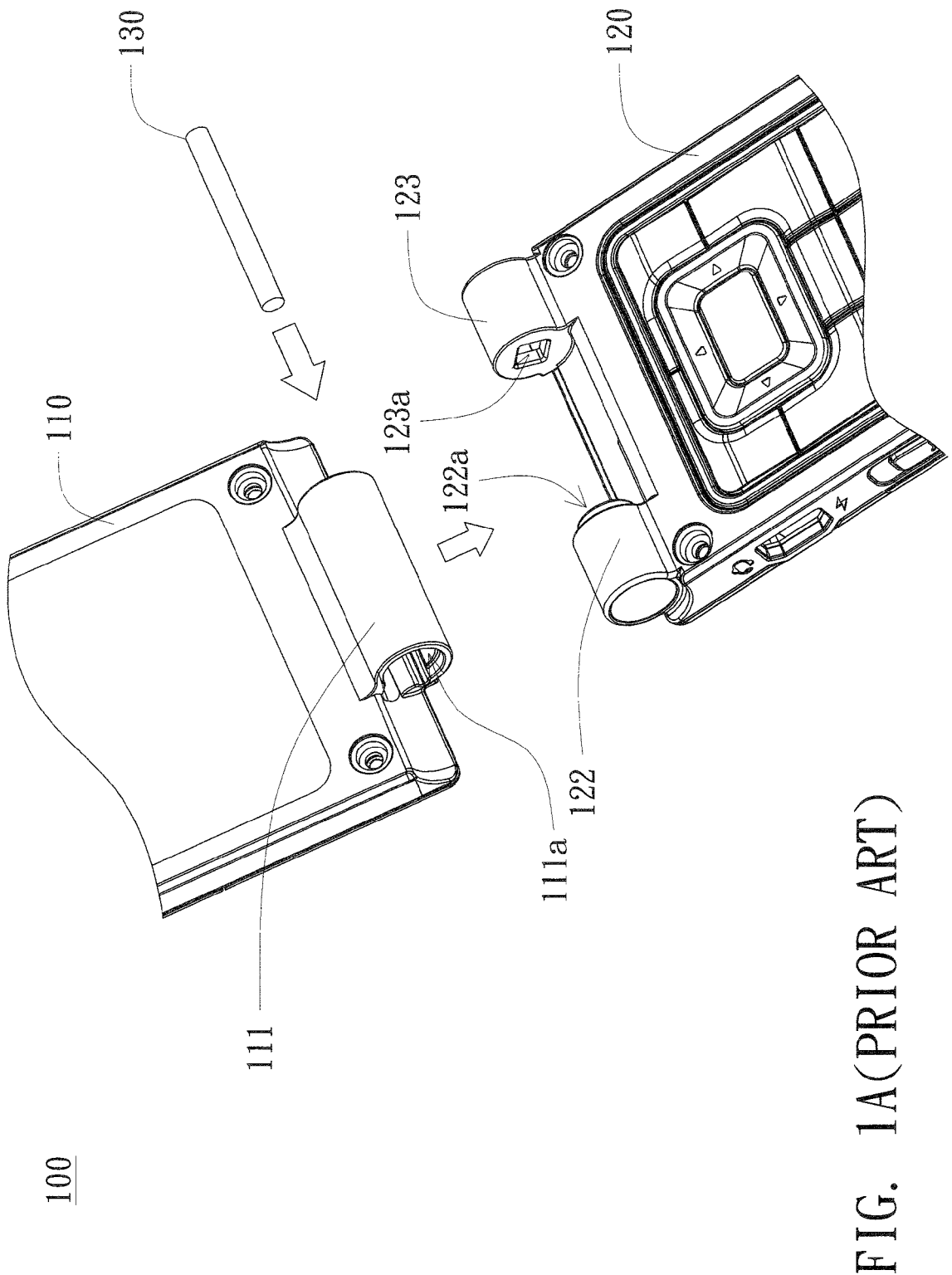
FIG. 1A is an exploded diagram of a conventional mobile phone.
Figure 1B:
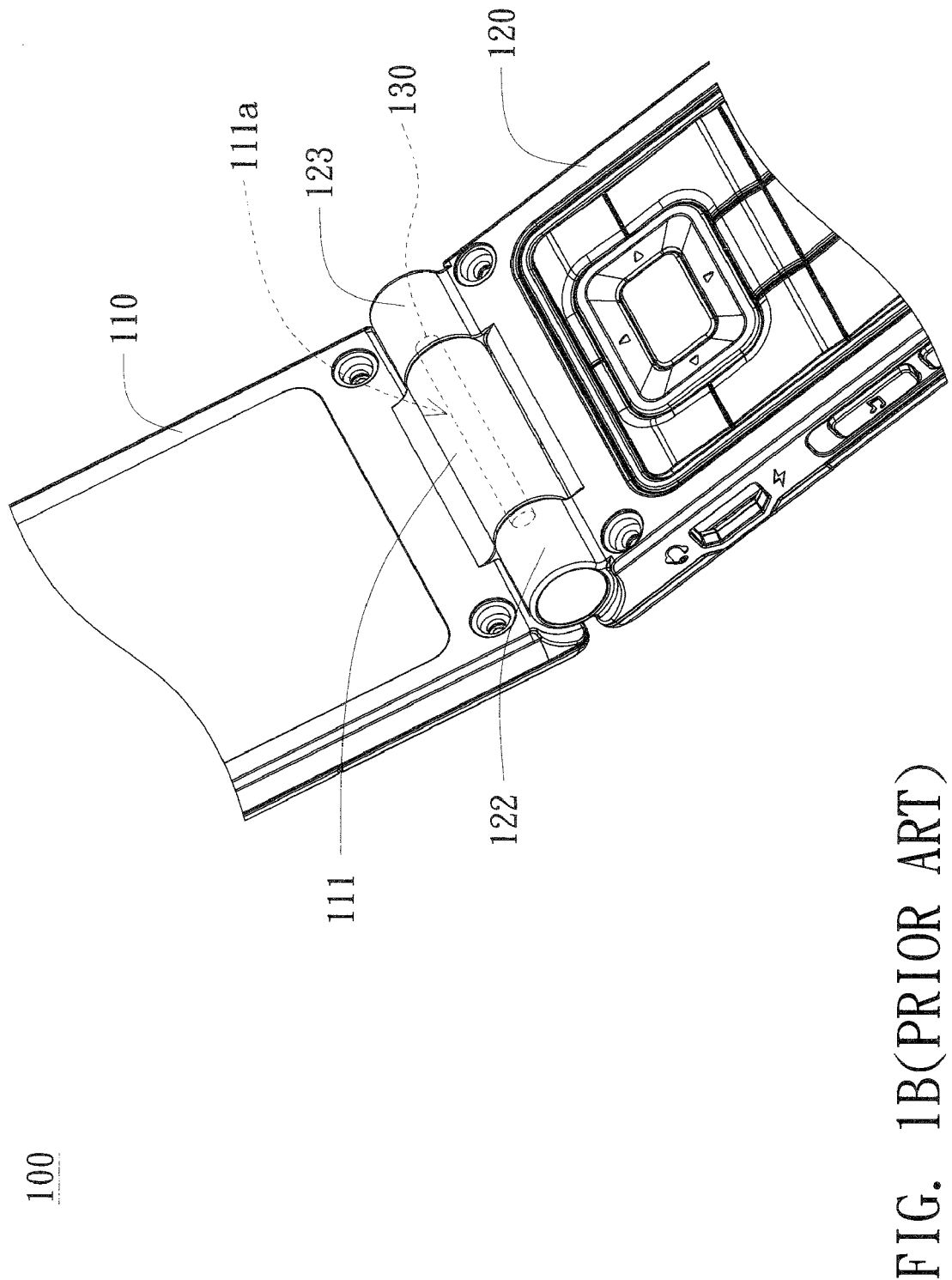
FIG. 1B is an assembly diagram of the mobile phone of FIG. 1A.
Figures 2A, 2B:
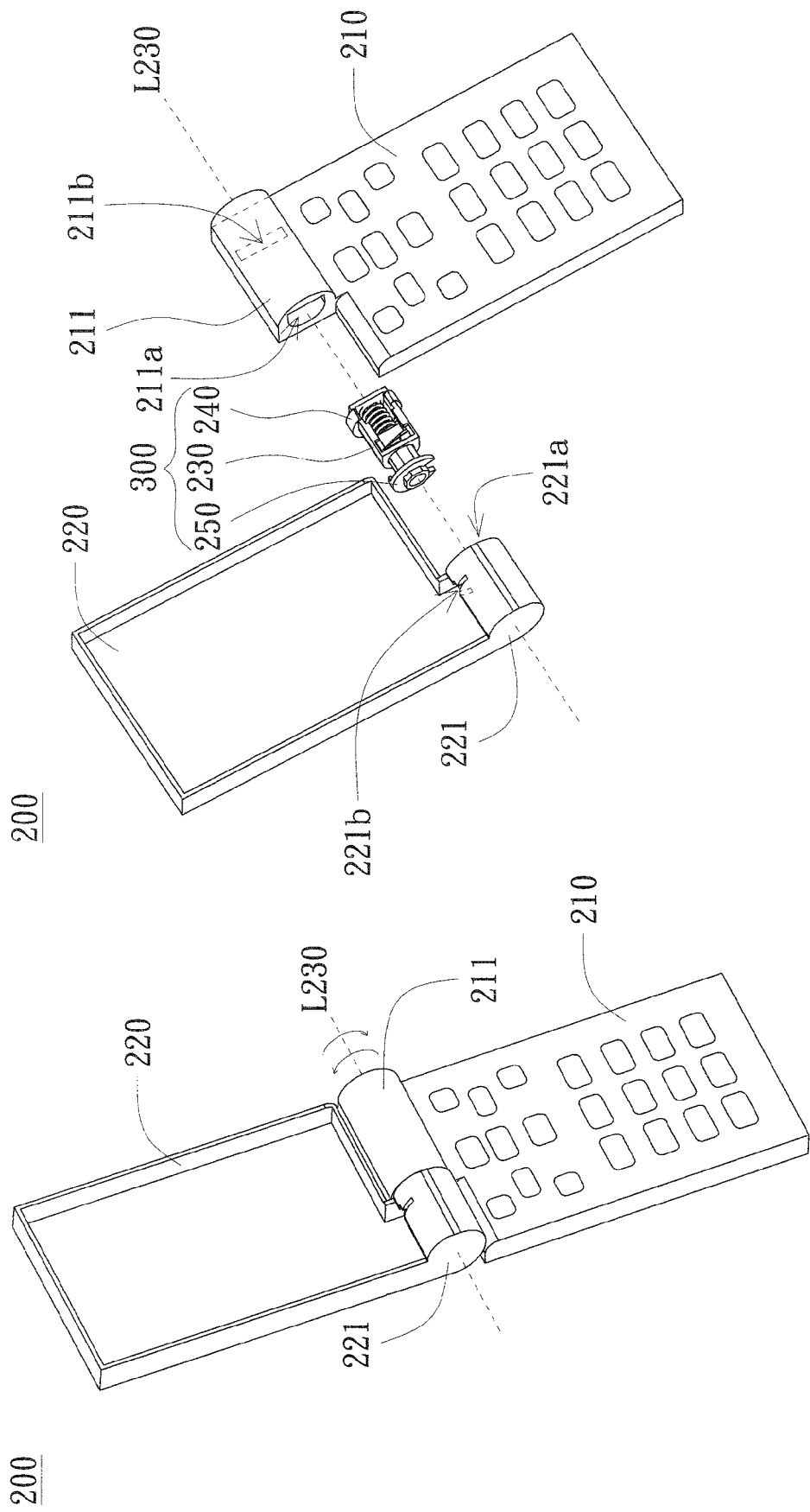
FIG. 2A is a perspective of an electronic device according to a preferred embodiment of the invention.
FIG. 2B is an exploded diagram of the electronic device of FIG. 2A.

Referring to both FIG. 2A and FIG. 2B. FIG. 2A is a perspective of an electronic device 200 according to a preferred embodiment of the invention. FIG. 2B is an exploded diagram of the electronic device 200 of FIG. 2A. The electronic device 200 can be a mobile phone, a calculator, an electronic dictionary or a personal digital assistant (PDA). In the present embodiment of the invention, the electronic device 200 is exemplified by a mobile phone. The electronic device 200 includes a first casing 210 and a second casing 220. In the present embodiment of the invention, a keypad module is disposed inside the first casing 210, and a display screen is disposed inside the second casing 220. The second casing 220 is rotated with respect to the first casing 210 via a single pivot structure. When the second casing 220 is rotated to press the first casing 210, the electronic device 200 is closed. Meanwhile, the display screen is received between the first casing 210 and the inner surface of the second casing 220 to avoid the display screen being collided. When the second casing 220 is rotated away from the first casing 210, the electronic device 200 is activated. Meanwhile, the user can control the keypad module to view an image displayed on the screen.

As indicated in FIG. 2B, the electronic device 200 further includes a rotating mechanism 300. The rotating mechanism 300 includes a shaft 230, a first fixing element 240 and a second fixing element 250. The first casing 210 has a first receiving space 211a and a first hole 211b disposed on a first side 211 thereof, wherein the first receiving space 211a is intercommunicated with the first hole 211b. The second casing 220 has a second receiving space 221a and a second hole 221b disposed a second side 221 thereof, wherein the second receiving space 221a is intercommunicated with the second hole 221b. The shaft 230 has a center axis L230, wherein part of the shaft 230 is received in the first receiving space 211a and part of the shaft 230 is received in the second receiving space 221a, such that the first casing 210 can be rotated around the center axis L230 with respect to the second casing 220. The first fixing element 240 is inserted into the first hole 211b and is coupled with the shaft 230, such that the shaft 230 will not be moved with respect to the first casing 210 along the direction of the center axis L230. The second fixing element 250 is inserted into the second hole 221b and is coupled with the shaft 230, such that the shaft 230 will not be moved with respect to the second casing 220 along the direction of the center axis L230. The detailed structure and assembly order for the elements of the electronic device 200 are elaborated below.

Figure 3B:
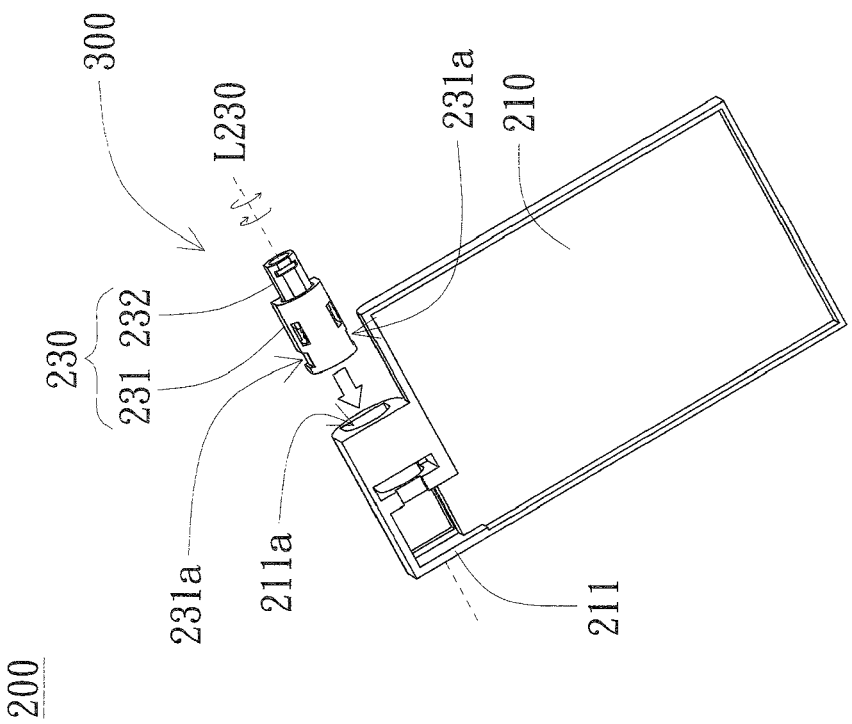
FIG. 3B is a back view of the shaft and the first casing of FIG. 3A.
Figure 3A:
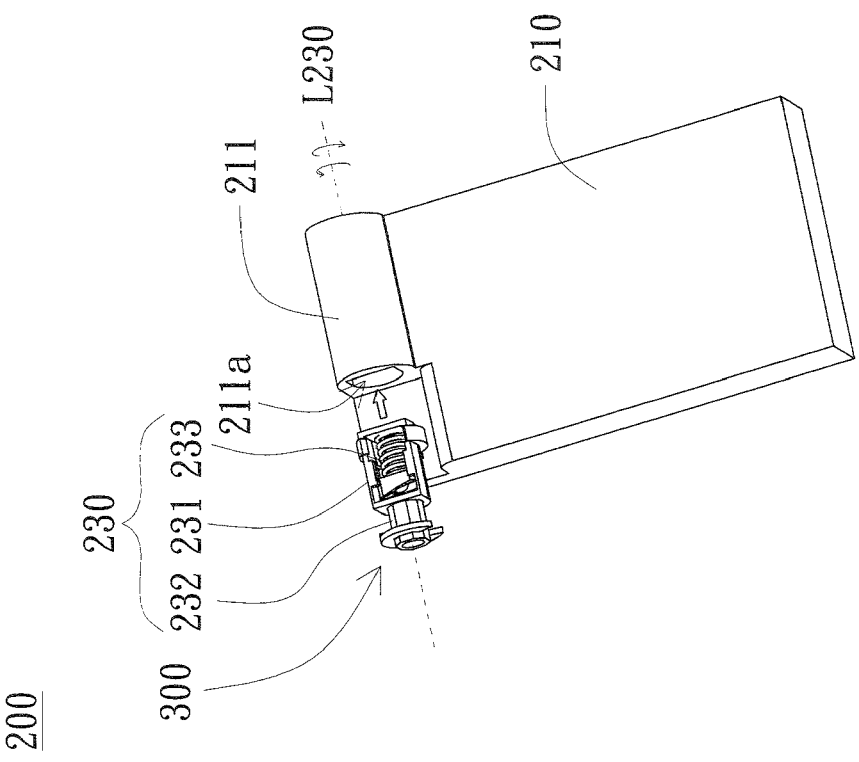
FIG. 3A is an assembly diagram of a first casing and a shaft according to the preferred embodiment of the invention.

Referring to both FIGS. 3A and 3B. FIG. 3A is an assembly diagram of a first casing 210 and a shaft 230 according to the preferred embodiment of the invention. FIG. 3B is a back view of the shaft and the first casing 210 of FIG. 3A. The first casing 210 has a first receiving space 211a disposed a first side 211 thereof. The shaft 230 is inserted into the first receiving space 211a along the direction of the center axis L230. The shaft 230 includes a hollowed column 231 and a spindle 232, wherein the spindle 232 is mounted in the hollowed column 231. The hollowed column 231 can be rotated with respect to the spindle 232.

Preferably, the shaft 230 further includes an elastic element 233 disposed between the spindle 232 and the hollowed column 231. When the hollowed column 231 is rotated with respect to the spindle 232, the elastic element 233 provides a restoring elasticity for restoring the relative position between the hollowed column 231 and the spindle 232.

Figure 4B:
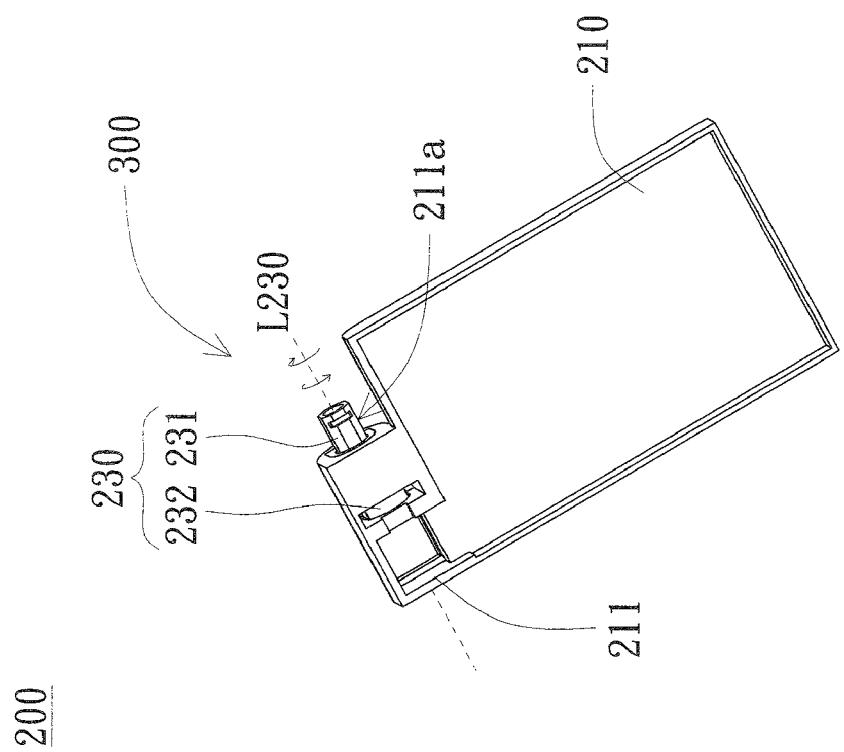
FIG. 4B is a back view of the shaft and the first casing of FIG. 4A.
Figure 4A:
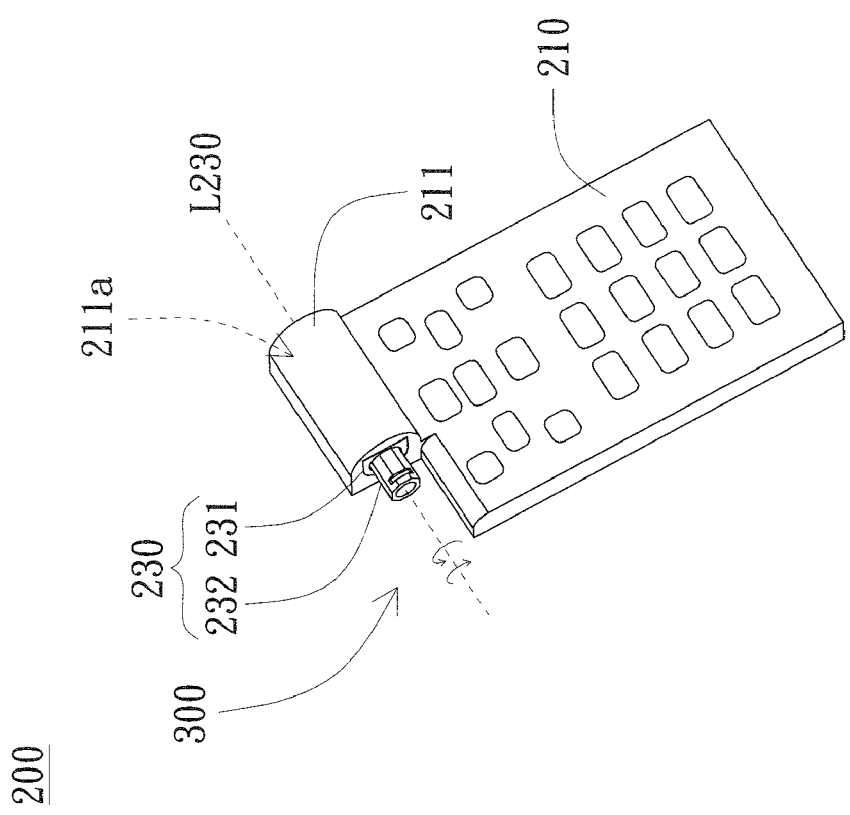
FIG. 4A is a perspective of the shaft and the first casing of FIG. 3A with the shaft being inserted into the first receiving space.

Referring to both FIG. 4A and FIG. 4B. FIG. 4A is a perspective of the shaft and the first casing 210 of FIG. 3A with the shaft 230 being inserted into the first receiving space 211a. FIG. 4B is a back view of the shaft 230 and the first casing 210 of FIG. 4A. When the shaft 230 is inserted into the first receiving space 211a along the direction of the center axis L230, part of the hollowed column 231 is received in the first receiving space 211a. Preferably, the hollowed column 231 has a semicircular cross-section, and the first receiving space 211a also has a corresponding semicircular cross-section. When part of the hollowed column 231 is received in the first receiving space 211a, the inner wall of the first receiving space 211a substantially presses the surface of the hollowed column 231, such that the inner wall of the first receiving space 211a incapacitates the hollowed column 231 from rotating within the first receiving space 211a. Thus, when the hollowed column 231 is rotated with respect to the spindle 232, the hollowed column 231 drives the first casing 210 to synchronically rotate with respect to the spindle 232.

Figure 5:
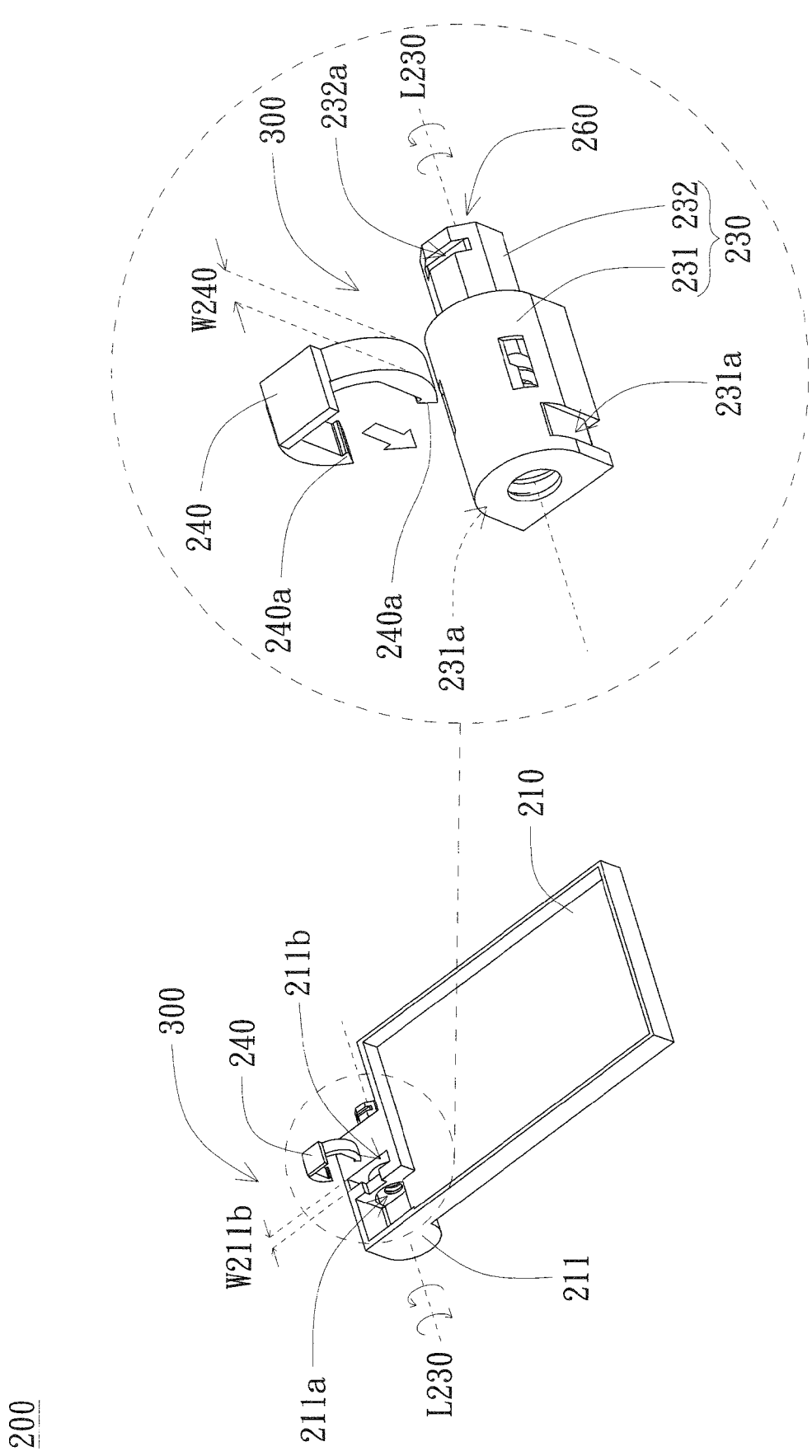
FIG. 5 is a perspective of the first casing, the shaft and the first fixing element of FIG. 4B.

Referring to FIG. 5, a perspective of the first casing, the shaft 230 and the first fixing element 240 of FIG. 4B is shown. The first fixing element 240 is inserted into the first hole 211b and is coupled with the shaft 230.

The hollowed column 231 has two first recesses 231a disposed at one end of the hollowed column 231 and opposite to the first hole 211b (the two first recesses 231a are illustrated in FIG. 3B). The first fixing element 240 is inserted into the first hole 211b and is coupled with the first recess 231a, such that the first fixing element 240 is coupled with the shaft 230. Despite the present embodiment of the invention is exemplified by two first recess 231a, the number of the first recess 231a is not for limiting the scope of protection of the invention.

Preferably, the first fixing element 240 includes at least one first hook 240a for engaging the first fixing element 240 with the hollowed column 231, and the width W240 of the first fixing element 240 along the direction of the center axis L230 is substantially equal to the width W211b of the first hole 211b along the direction of the center axis L230, such that the first fixing element 240 more firmly limits the movement of the shaft 230 with respect to the first casing 210 along the direction of the center axis L230.

As indicated in FIG. 5, the shaft 230 has a wiring channel 260 for placing a flexible wire, the wiring channel 260 is disposed along the direction of the center axis L230 of the shaft 230 and intercommunicates the first receiving space 211a of the first casing 210 with the second receiving space 221a of the second casing 220. One end of the flexible wire is connected to the internal circuit boards of the first casing 210, passes through the first receiving space 211a, the wiring channel 260 and the second receiving space 221a, and then is connected to the display screen or other electronic elements inside the second casing 220.

The flexible wire will not be compressed regardless of the rotation of the first casing 210 and the second casing 220 rotate.

Referring to FIG. 6, a perspective of the shaft 230 and the first casing 210 of FIG. 5 with the first fixing element 240 having been inserted into the first hole 211b is shown. As indicated in FIG. 6, after the first fixing element 240 is inserted into the first hole 211b, part of the first fixing element 240 is engaged with the hollowed column 231 and part of the first fixing element 240 presses the first casing 210. Thus, the shaft 230 will not be moved with respect to the first casing 210 along the direction of the center axis L230.

Referring to FIG. 7, a perspective of the first casing 210, the shaft 230 and the second casing 220 of FIG. 6 is shown. The second casing 220 enables the spindle 232 to be mounted in the second receiving space 221a along the direction of the center axis L230 for part of the shaft 230 to be received in the second receiving space 221a.

Figure 8:
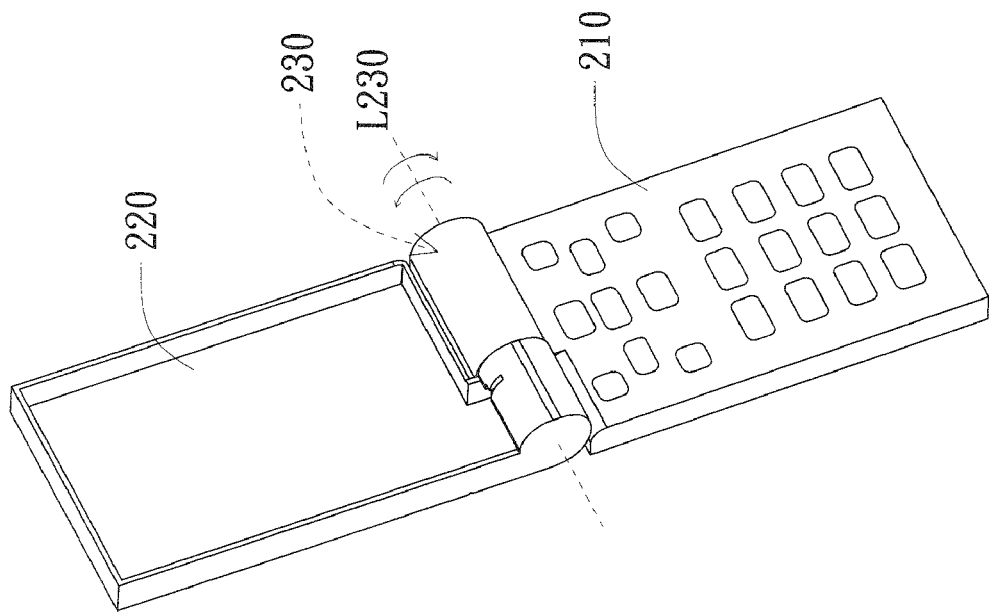
FIG. 8 is a perspective of the spindle of FIG. 7 with the second casing being mounted on the shaft.

Referring to both FIG. 7 and FIG. 8. FIG. 8 is a perspective of the spindle 232 of FIG. 7 with the second casing 220 being mounted on the shaft 230. After the second casing 220 is mounted on the spindle 232, the second casing 220 and the spindle 232 are synchronized and moved accordingly with respect to the hollowed column 231, wherein the hollowed column 231 and the first casing 210 are synchronized and moved accordingly. Through the spindle 232 and the hollowed column 231, the second casing 220 can be rotated around the center axis L232 with respect to the first casing 210.

Figure 9:
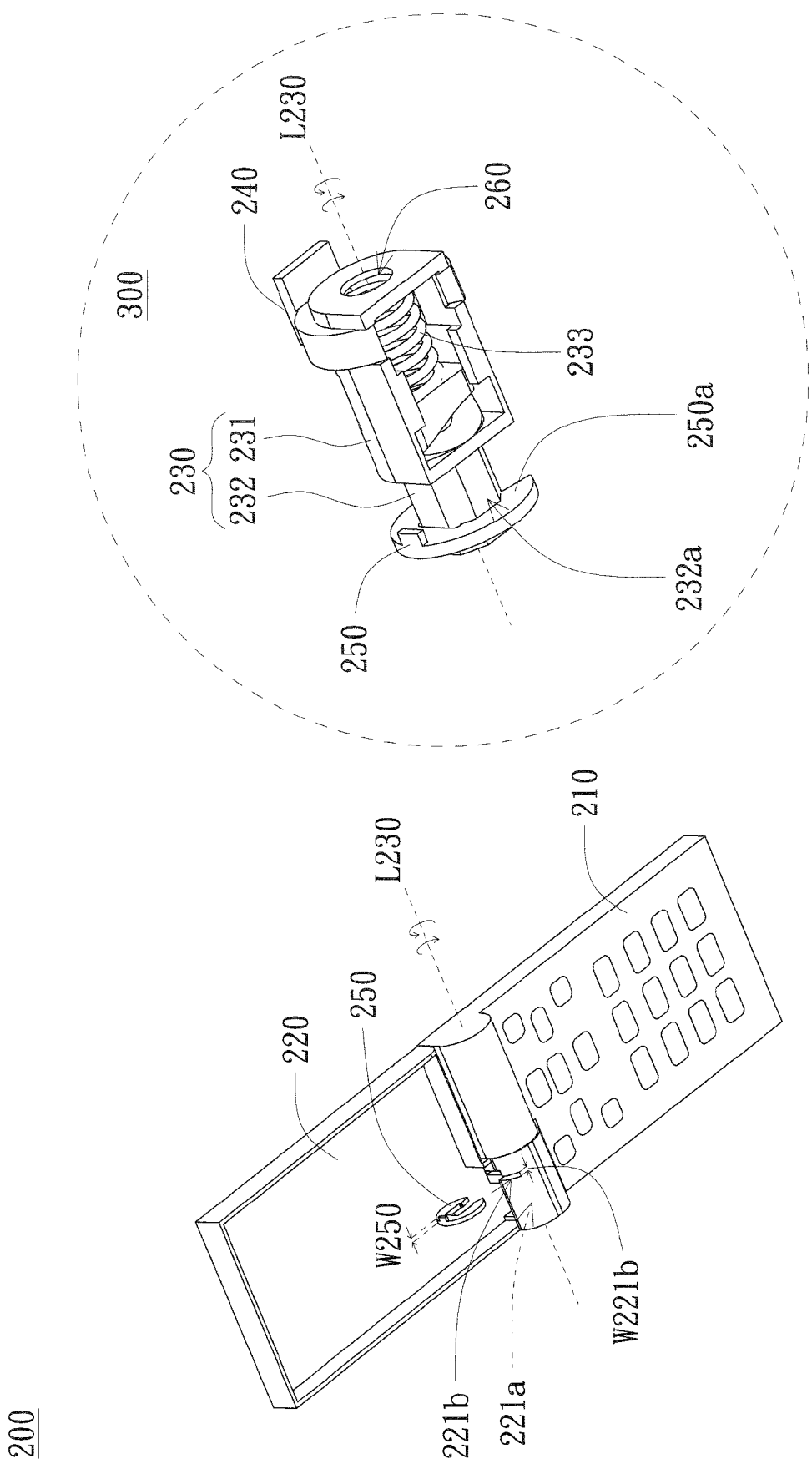
FIG. 9 is a perspective of the first casing, the second casing, the shaft and the second fixing element of FIG. 8.

Referring to FIG. 9, a perspective of the first casing 210, the second casing 220, the shaft 230 and the second fixing element 250 of FIG. 8 is shown. The second fixing element 250 is inserted into the second hole 221b and is coupled with the shaft 230.

The spindle 232 has two second recesses 232a, wherein the second recess 232a is more clearly illustrated in FIG. 5 but only one second recess 232a is illustrated in both FIG. 5 and FIG. 9. The second recesses 232a is disposed at one end of the spindle 232 and opposite to the second hole 221b. The second fixing element 250 is inserted into the second hole 221b and is coupled with the second recess 232a. Despite the present embodiment of the invention is exemplified by two second recesses 232a, the number of the second recess 232a is not for limiting the scope of technology of the invention.

Preferably, the second fixing element 250 includes at least one second hook 250a for engaging the second fixing element 250 with the spindle 232, and the width W250 of the second fixing element 250 along the direction of the center axis L230 is substantially equal to the width W221b of the second hole 221b along the direction of the center axis L230, such that the second fixing element 250 limits the movement of the shaft 230 with respect to the second casing 220 along the direction of the center axis L230 more firmly.

Figure 10:
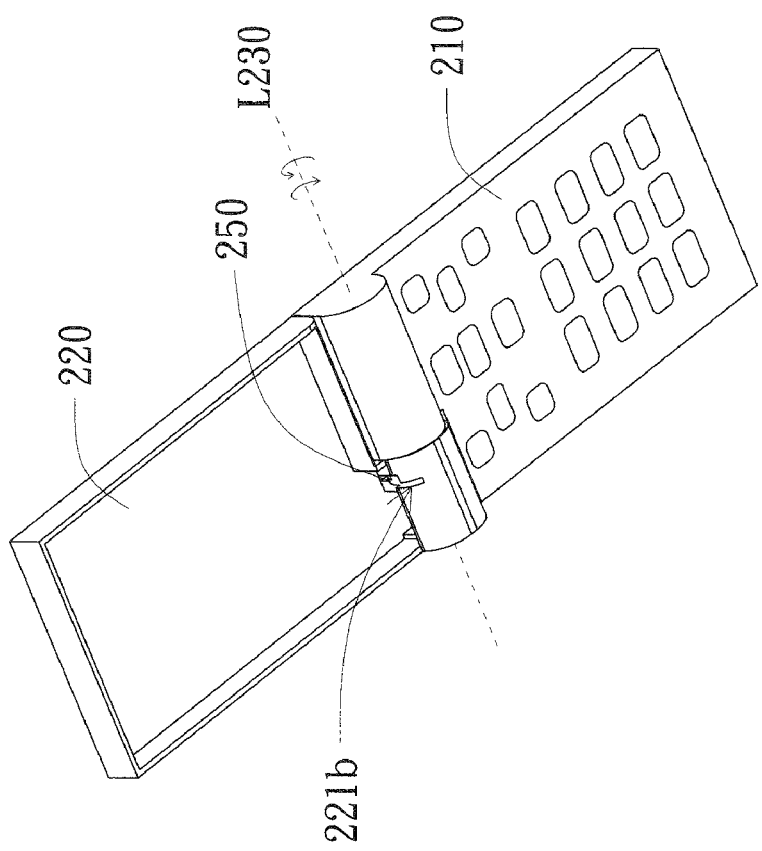
FIG. 10 is a perspective of the electronic device of FIG. 9 with the second fixing element having been inserted into the second hole.

Referring to both FIG. 9 and FIG. 10. FIG. 10 is a perspective of the electronic device 200 of FIG. 9 with the second fixing element 250 having been inserted into the second hole 221b. As indicated in FIG. 10, after the second fixing element 250 is inserted into the second hole 221b, part of the second fixing element 250 is engaged with the spindle 232 and part of the second fixing element 250 presses the second casing 220. Thus, the rotating mechanism 300 will not be moved with respect to the second casing 220 along the direction of the center axis L230.

After the first casing 210 and the second casing 220 are assembled, the first casing 210, the first fixing element 240 and the hollowed column 231 are synchronized and moved accordingly. The second casing 220, the second fixing element 250 and the spindle 232 are synchronized and moved accordingly. When the hollowed column 231 is rotated with respect to the spindle 232, the first casing 210, the first fixing element 240 and the hollowed column 231 are synchronized and moved accordingly with respect to the second casing 220, the second fixing element 250 and the spindle 232. Besides, when the hollowed column 231 is rotated with respect to the spindle 232, the elastic element 233 further provides a restoring elasticity for restoring the relative position between the hollowed column 231 and the spindle 232. Thus, the first casing 210 and the second casing 220 can be opened or closed by means of the hollowed column 231 and the spindle 232 of the shaft 230.

According to the electronic device and the rotating mechanism thereof disclosed in the above embodiment of the invention, the assembly of the electronic device is simplified with the structure of combining a shaft with a first fixing element and a second fixing element. Firstly, the shaft is mounted on the first casing first. Next, the second casing is mounted on the shaft. Then, a first fixing element is inserted into the first hole and is coupled with the shaft, and a second fixing element is inserted into the second hole and is coupled with the shaft. The assembly process is simplified, not only the decreasing the required labor hour but also reducing the defects. Moreover, the shaft has a wiring channel, such that the flexible wire can easily pass through the wiring channel, further resolving the difficulty encountered during wiring.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a first casing having a first receiving space and a first hole disposed on a first side thereof, wherein the first receiving space is intercommunicated with the first hole;

a second casing having a second receiving space and a second hole disposed on a second side thereof, wherein the second receiving space is intercommunicated with the second hole; and a rotating mechanism, comprising:

a shaft having a center axis, wherein part of the shaft is received in the first receiving space and part of the shaft is received in the second receiving space, such that the first casing can be rotated around the center axis with respect to the second casing;

a first fixing element inserted into the first hole and coupled with the shaft, such that the shaft will not be moved with respect to the first casing along the direction of the center axis; and a second fixing element inserted into the second hole and coupled with the shaft, such that the shaft will not be move with respect to the second casing along the direction of the center axis.

2. The electronic device according to claim 1, wherein the shaft comprises:

a hollowed column; and a spindle mounted in the hollowed column, wherein at least part of the hollowed column is received in the first receiving space, at least part of the spindle is received in the second receiving space, and the hollowed column is rotated with respect to the spindle for rotating the first casing with respect to the second casing.

3. The electronic device according to claim 2, wherein the hollowed column has at least two first recesses disposed at one end of the hollowed column and opposite to the first hole, the spindle has at least two second recesses disposed at one end of the spindle and opposite to the second hole, the first fixing element is inserted into the first hole and is coupled with the first recesses, and the second fixing element is inserted into the second hole and is coupled with the second recesses.

4. The electronic device according to claim 2, wherein the hollowed column has a semicircular cross-section, and the first receiving space has another corresponding semicircular cross-section, so that the inner wall of the receiving space limits the rotation of the hollowed column.

5. The electronic device according to claim 1, wherein the first fixing element comprises a first hook for engaging the first fixing element with the shaft, and the second fixing element comprises a second hook for engaging the second fixing element with the shaft.

6. The electronic device according to claim 1, wherein the shaft has a wiring channel for placing a flexible wire, and the wiring channel is disposed along the center axis of the shaft.

7. The electronic device according to claim 1, wherein the width of the first fixing element along the direction of the center axis is substantially equal to that the width of the first hole along the direction of the center axis, and the width of the second fixing element along the direction of the center axis is substantially equal to the width of the second hole along the direction of the center axis.

8. A rotating mechanism disposed in an electronic device, wherein the electronic device comprises a first casing and a second casing, the first casing has a first receiving space and a first hole disposed a first side thereof, the first receiving space is intercommunicated with the first hole, and the second casing has a second receiving space and a second hole disposed a second side thereof, the second receiving space is intercommunicated with the second hole, the rotating mechanism comprises:

a shaft having a center axis, wherein part of the shaft is received in the first receiving space and part of the shaft is received in the second receiving space, such that the first casing can be rotated around the center axis with respect to the second casing;

a first fixing element inserted into the first hole and coupled with the first recess, such that the shaft will not be moved with respect to the first casing along the direction of the center axis; and a second fixing element inserted into the second hole and coupled with the second recess, such that the shaft will not be move with respect to the second casing along the direction of the center axis.

9. The rotating mechanism according to claim 8, wherein the shaft comprises a hollowed column and a spindle, the spindle is mounted in the hollowed column, at least part of the hollowed column is received in the first receiving space, at least part of the spindle is received in the second receiving space, and the hollowed column is rotated with respect to the spindle for driving the first casing to rotate with respect to the second casing.

10. The rotating mechanism according to claim 9, wherein the hollowed column has at least two first recesses, the first recesses is disposed at one end of the hollowed column and opposite to the first hole, the spindle has at least two second recesses disposed at one end of the spindle and opposite to the second hole, the first fixing element is inserted into the first hole and is coupled with the first recesses, the second fixing element is inserted into the second hole and is coupled with the second recesses.

11. The rotating mechanism according to claim 9, wherein the hollowed column has a semicircular cross-section, and the first receiving space has another corresponding semicircular cross-section, such that the inner wall of the receiving space limits the rotation of the hollowed column.

12. The rotating mechanism according to claim 8, wherein the first fixing element comprises a first hook for engaging the first fixing element with the shaft, and the second fixing element comprises a second hook for engaging the second fixing element with the shaft.

13. The rotating mechanism according to claim 8, wherein the shaft has a wiring channel for placing a flexible wire, and the wiring channel is disposed along the center axis of the shaft.

14. The rotating mechanism according to claim 8, wherein the width of the first fixing element along the direction of the center axis is substantially equal to that the width of the first hole along the direction of the center axis, and the width of the second fixing element along the direction of the center axis is substantially equal to the width of the second hole along the direction of the center axis.

* * * * *